United States Patent [19]

Nagai et al.

[11] Patent Number: 4,897,275

[45] Date of Patent: Jan. 30, 1990

[54] PROCESS FOR PREPARING FROZEN FRIED FOOD

[75] Inventors: Koji Nagai; Setsuko Aoki; Masaru Furuta, all of Tokyo, Japan

[73] Assignee: Taiyo Fishery Co., Ltd., Tokyo, Japan

[21] Appl. No.: 198,320

[22] Filed: May 25, 1988

[30] Foreign Application Priority Data

Jun. 18, 1987 [JP] Japan .................................. 62-151849

[51] Int. Cl.$^4$ ................................................ A23B 4/10
[52] U.S. Cl. .................... 426/289; 426/438; 426/439; 426/555
[58] Field of Search ............... 426/289, 296, 96, 438, 426/290, 291, 292, 293, 273, 552, 555, 439

[56] References Cited

U.S. PATENT DOCUMENTS

| | | | |
|---|---|---|---|
| 3,979,798 | 8/1976 | Young | 426/438 |
| 4,068,009 | 1/1978 | Rispoli | 426/296 |
| 4,199,603 | 4/1980 | Sortwell | 426/96 |
| 4,208,442 | 6/1980 | Evans | 426/96 |
| 4,260,637 | 4/1981 | Rispoli | 426/96 |
| 4,342,788 | 8/1982 | Clatfelter | 426/438 |
| 4,496,601 | 1/1985 | Rispoli | 426/555 |
| 4,511,583 | 4/1985 | Olson | 426/296 |
| 4,675,197 | 6/1987 | Banner | 426/296 |
| 4,710,391 | 12/1987 | Kirn | 426/289 |
| 4,741,933 | 5/1988 | Larsson et al. | 426/296 |
| 4,767,637 | 8/1988 | Ek | 426/291 |

FOREIGN PATENT DOCUMENTS

198255  11/1983  Japan .................................. 426/291

*Primary Examiner*—Carolyn Paden
*Attorney, Agent, or Firm*—Frishauf, Holtz, Goodman & Woodward

[57] ABSTRACT

A frozen fried food is prepared by coating a food material to be fried with a particle/powder mixture comprising porous particles and a hygroscopic powder at a ratio by weight of 1:10 to 10:1, optionally semi-frying the coated material, and then freezing the same. The fried food thus obtained has a crunchy coating and shows a crispy and fresh-fried texture not only when fried in oil but also when heated in a microwave oven or an ordinary oven and maintains said texture for a prolonged period of time.

15 Claims, No Drawings

PROCESS FOR PREPARING FROZEN FRIED FOOD

BACKGROUND OF THE INVENTION

1. Field of the Invention

This invention relates to a process for preparing a frozen fried food which has a crunchy coating, shows a crispy and fresh-fried texture not only when fried in oil but also when heated with a microwave oven or an ordinary oven, and maintains said texture for a prolonged period of time after heating, compared with conventional fried foods.

2. Description of the Prior Art

A fried food is generally prepared at home or a restaurant by coating a core material with a powder mainly comprising, for example, wheat flour, further coating the powder-coated material with a batter comprising a mixture of, for example, wheat flour, albumen and water, furthermore coating the same with particles such as bread crumbs or cracker crumbs or a powder such as wheat flour, if necessary, and then frying the same in oil. The fried food thus prepared has an excellent texture and a fine appearance.

On the other hand, a commercially available frozen fried food is prepared by freezing a food material which is coated in the abovementioned manner and optionally fried in oil at a temperature of 170° to 180° C. for 0.5 to 1.0 minute.

This frozen fried food shows an excellent texture immediately after frying. When it is allowed to stand in, for example, a lunchbox after frying, however, the coating would absorb moisture and thus becomes noncrispy and moist.

In addition, when this frozen fried food is not fried in oil but heated in a microwave oven or an ordinary oven, the coating would absorb moisture and thus fail to exhibit crispiness which is observed immediately after frying.

SUMMARY OF THE INVENTION

It is an object of the present invention to provide a process for preparing a frozen fried food which has a crunchy coating and shows a crispy and fresh-fried texture not only when fried in oil but also when heated with a microwave oven or an ordinary oven, and maintains said texture for a prolonged period of time after heating.

As a result of extended studies, the present inventors have found that the above object can be achieved by coating a food material to be fried with a mixture which comprises porous and crispy particles and a hygroscopic powder at a specific ratio.

Accordingly, the present invention, which has been completed based on the above finding, provides a process for preparing a frozen fried food comprising coating a food material to be fried with a particle/powder mixture which comprises porous and crispy particles and a hygroscopic powder at a ratio of 1:10 to 10:1, optionally semifrying the coated material, and then freezing the same.

According to the process of the present invention, a frozen fried food can be prepared, which has a crunchy coating and shows a crispy and fresh-fried texture not only when fried in oil but also when heated with a microwave oven or an ordinary oven, and maintains said texture for a prolonged period of time after heating.

DETAILED DESCRIPTION OF THE INVENTION

Now the process for preparing a frozen fried food of the present invention will be described in detail.

As the food material to be fried by the process of the present invention, any conventional one such as fish, flesh or fowl meat or vegetable may be used. This food material may be either raw or frozen. When a frozen material is employed therefor, it is preferable to semi-thaw the same, since a completely frozen material is hardly processable while an excessively thawed one would drip.

The porous particles constituting the particle/powder mixture to be used in the process of the present invention may be obtained by molding into particles a material which would solidify and give a porous and crispy texture when heated alone or together with water and dried, and then heating the same, or by heating said material and then grinding the same. It is particularly preferable to use particles obtained by adding water to a material which would give particles having excellent shape retentivity when mixed with water and then fried, and frying the obtained mixture by dropping the same into oil, or frying said mixture in oil and then grinding the fried mixture. Alternately, bread crumbs, "tenkasu" (fried batter particles to be discarded as waste) or cracker crumbs may be used as said porous particles. It is preferable that 10 to 90% of these porous particles have particle sizes ranging from 3 to 50 mesh, and that the average particle size thereof is 3 to 25 mesh.

Examples of the starting material for these porous particles include wheat flour, starch, gluten, soybean protein, corn mill, glutinous rice flour, rice flour, soybean mill, mashed potatoes, milk protein, fish meat, flesh meat, yolk and albumen. These materials may contain various seasonings such as common salt or sodium glutamate.

Examples of the hygroscopic powder, which is another component of the particle/powder mixture to be used in the process of the present invention, include wheat flour, starch, gluten powder, soybean protein powder, corn mill, glutinous rice flour, rice flour, soybean mill, mashed potato powder, milk protein powder, fish meat powder, flesh meat powder, dry albumen powder and dry yolk powder. These materials may contain powdery seasonings.

The particle/powder mixture to be used in the process of the present invention comprises said porous particles and said hygroscopic powder at a ratio by weight of 1:10 to 10:1, preferably 1:2 to 5:1. When the mixing ratio is out of the range as defined above, the aimed crispy texture can hardly be achieved.

Said porous particles may be mixed with said hygroscopic powder with, for example, a rotary mixer, a fixed mixer equipped with a rotor blade or a flow mixer.

Namely the process for preparing a frozen fried food of the present invention may start with coating the food material to be fried with said particle/powder mixture comprising said porous particles and said hygroscopic powder at said ratio.

Then the food material thus coated with the particle/powder mixture is optionally semi-fried in oil and frozen to thereby give a frozen fried food.

Conditions for the semi-frying vary depending on the size and type of the food material to be fried. Generally it may be carried out in a manner similar to a conventional frying process, i.e., heating the coated material in refined soybean oil, salad oil or a hardened oil at a temperature of 170° to 180° C. for 0.2 to 5 minutes.

The freezing may be carried out in a conventional manner.

The frozen fried food thus prepared may be usually stored and marketed in a frozen state and then heated by frying in oil or with a microwave oven or an ordinary oven at home or a restaurant.

Prior to the coating of the food material to be fried with the abovementioned particle/powder mixture, the food material may be coated with a powder, like in a conventional process for preparing a fried food, to thereby achieve uniform distribution of the moisture on the surface of the food material. Any conventionally employed one may be used as the coating powder. Examples thereof include a mixture comprising wheat flour such as less viscoelastic one, common salt, dry albumen and various seasonings.

Furthermore the food material to be fried, which has been optionally coated with the abovementioned powder, may be coated with a batter mainly comprising wheat flour and water to thereby accelerate the subsequent coating of the same with the particle/powder mixture. This batter preferably comprises 60 to 100% by weight of water and 0 to 40% by weight of wheat flour.

After coating with the particle/powder mixture, the food material may be further coated with the abovementioned batter mainly comprising wheat flour and water, thus improving the texture of the final fried food and to prevent the contamination thereof with oil at the frying step.

The coating of the food material with the batter mainly comprising wheat flour and water as described above may be effectively carried out by, for example, spraying said batter to the food material 20 to 30 cm apart therefrom at a pressure of 0.5 to 1 kg/cm$^2$.G.

To further illustrate the present invention, and not by way of limitation, the following Examples will be given.

EXAMPLE 1

78 parts of less viscoelastic wheat flour was mixed with 1 part of common salt, 2 parts of a dry albumen powder and 8 parts of mashed potatoes to thereby give a coating powder. Separately, particles which had been prepared by mixing 100 parts of the powder of the composition of Table 1 with 100 parts of water, dropping the obtained mixture into oil at 170° C., frying each drop in the oil for approximately one minute, and drying the fried matter were mixed with a powder of the composition as shown in Table 1 at a ratio by weight of 1:2 to give a particle/powder mixture.

TABLE 1

|  | % by weight |
|---|---|
| less viscoelastic wheat flour | 83.0 |
| corn starch | 8 |
| sodium bicarbonate | 1.0 |
| sodium glutamate | 1.0 |
| common salt | 3.0 |
| dry albumen | 4.0 |
| in total | 100.0 |

Cuttlefish slices were successively coated with the abovementioned coating powder and with the particle/powder mixture. Further a mixture comprising water and wheat flour at a ratio by weight of 1:4 was sprayed thereon. Then the coated slices were fried in refined soybean oil at 180° C. for 0.5 minute and frozen.

Thus the frozen fried food of the present invention was obtained.

A frozen fried cuttlefish slice thus obtained was fried in oil in the frozen state at 160° C. for 3 minutes. Separately, two slices thereof were heated in a microwave oven or an ordinary oven until the material temperature, i.e., the temperature at the center of each slice, reached 85° C. These three slices of the frozen fried food of the present invention and a commercially available frozen fried cuttle-fish fried in oil at 160° C. for 3 minutes (control) were allowed to stand at room temperature. Thus changes in the coatings of these samples with the lapse of time were compared with each other.

As a result, 22 panelists among 25 estimated that there was little difference among the crispy textures of the samples immediately after frying or heating. However 15 among 25 and 22 among 25 pointed out that the coatings of the three samples according to the present invention were superior in the crispy texture to that of the control one after 30 minutes and 1 hour, respectively.

EXAMPLE 2

A batter mix of the composition as shown in Table 2 was prepared. Separately, particles which had been prepared by mixing 10 parts of a powder of the composition of Table 1 of Example 1 with 5 parts of water, thoroughly kneading the resulting mixture, molding the mixture into a plate (30 cm×20 cm×0.5 cm), drying the plate in a thermostatic drier at 105° C. for 20 hours, and grinding the same to give an average particle size of approximately 10 mesh was mixed with a powder of the composition of Table 1 of Example 1 at a ratio of 2:1 to give a particle/powder mixture.

TABLE 2

|  | % by weight |
|---|---|
| wheat flour | 88.0 |
| monoglyceride | 3.0 |
| common salt | 4.0 |
| sodium glutamate | 2.0 |
| nucleic acid seasoning | 0.2 |
| sodium bicarbonate | 1.3 |
| casein soda | 1.5 |
| in total | 100.0 |

Raw oysters were coated with a batter solution comprising 1 part of the abovementioned batter and 4 parts of water and then with the abovementioned particle/powder mixture. Then the coated oysters were rapidly frozen to thereby give the frozen fried food of the present invention.

A frozen coated oyster thus obtained was fried in oil in the frozen state at 180° C. for 3 minutes. Separately, two of them were heated in a microwave oven or an ordinary oven until the material temperature, i.e., the temperature at the center of each oyster, reached 85° C. These three oysters of the frozen fried food of the present invention and a commercially available one fried in oil at 180° C. for 3 minutes (control) were allowed to stand at room temperature. Thus changes in the coatings of these fried oysters with the lapse of time were compared with each other.

As a result, 20 panelists among 23 estimated that there was little difference among the crispy textures of the samples immediately after frying or heating. However 16 among 23 and 20 among 23 pointed out that the coatings of the three samples according to the present invention were superior in the crispy texture to that of the control one after 30 minutes and 1 hour, respectively.

EXAMPLE 3

Salmon fillets were coated with a particle/powder mixture which had been prepared by mixing raw bread crumbs dried at 105° C. for 20 hours with a powder of the composition as shown in Table 3 at a ratio of 3:2. Then the coated fillets were immersed in a mixture comprising water and wheat flour at a ratio of 1:4 and subsequently fried in refined soybean oil at 180° C. for 0.5 minute. After freezing, the frozen fried food of the present invention was obtained.

TABLE 3

|  | % by weight |
| --- | --- |
| corn starch | 60 |
| dry whole egg | 23 |
| soybean protein powder | 8 |
| rice flour | 5 |
| common salt | 2 |
| sodium glutamate | 2 |
| in total | 100 |

A frozen fried salmon fillet thus obtained was fried in oil in the frozen state at 160° C. for 3 minutes. Separately, two fillets thereof were heated in a microwave oven or an ordinary oven until the material temperature, i.e., the temperature at the center of each fillet, reached 85° C. These three fillets of the frozen fried food of the present invention and a commercially available frozen fried salmon fillet fried in oil at 160° C. for 3 minutes (control) were allowed to stand at room temperature. Thus changes in the coatings of these samples with the lapse of time were compared with each other.

As a result, 22 panelists among 27 estimated that there was little difference among the crispy textures of the samples immediately after frying or heating. However 18 among 27 and 25 among 27 pointed out that the coatings of the three samples according to the present invention were superior in the crispy texture to that of the control one after 30 minutes and 1 hour, respectively.

EXAMPLE 4

Yellow Sea prawns were successively coated with the same coating powder as the one used in Example 1 and with a batter solution prepared by mixing 1 part of a batter mix of the composition of Table 2 of Example 2 with 3 parts of water. Then the coated prawns were further coated with the same particle/powder mixture as the one used in Example 3 and fried in soybean oil at 180° C. for 0.5 minute. After freezing, the frozen fried food of the present invention was obtained.

A frozen fried prawn thus obtained was fried in oil in the frozen state at 160° C. for 3 minutes. Separately, two of them were heated in a microwave oven or an ordinary oven until the material temperature, i.e., the temperature at the center of each prawn, reached 85° C. These three fried prawns of the present invention and a commercially available one fried in oil at 160° C. for 3 minutes (control) were allowed to stand at room temperature. Thus changes in the coatings of these samples with the lapse of time were compared with each other.

As a result, 17 panelists among 20 estimated that there was little difference among the crispy textures of the samples immediately after frying or heating. However 15 among 20 and 18 among 20 pointed out that the coatings of the three samples according to the present invention were superior in the crispy texture to that of the control one after 30 minutes and 1 hour, respectively.

What is claimed is:

1. A process for preparing a frozen fried food which comprises coating a food material to be fried with a particle/powder mixture comprising porous particle and a hygroscopic powder at a ratio of weight of 1:10 to 10:1, and then freezing the same; and wherein said porous particles comprise particles obtained by adding water to a material selected from the group consisting of wheat flour, starch, gluten, soybean protein, corn meal, glutinous rice flour, rice flour, soybean meal, mashed potatoes, milk protein, fish meat, flesh meat, yolk and albumen, and thereafter frying the resulting mixture in hot oil.

2. A process for preparing a frozen fried food as set forth in claim 1, wherein said hygroscopic powder is selected from among wheat flour, starch, gluten powder, soybean protein powder, corn mill, glutinous rice flour, rice flour, soybean mill, mashed potato powder, milk protein powder, fish meat powder, flesh meat powder, dry albumen powder and dry yolk powder.

3. The process of claim 2 wherein 10 to 90% of said porous particles have particle sizes ranging from 3 to 50 mesh and the average particle size thereof is 3 to 25 mesh.

4. The process of claim 3 wherein said hygroscopic powder is selected from the group consisting of wheat flour, starch, gluten powder, soybean protein powder, corn meal, glutinous rice flour, rice flour, soybean meal, mashed potato powder, milk protein powder, fish meat powder, flesh meat powder, dry albumen powder and dry yolk powder.

5. The process of claim 4 wherein said food material to be fried is coated with a powder prior to coating the same with said particle/powder mixture.

6. The process of claim 4 wherein said food material to be fried is coated with a mixture mainly comprising wheat flour and water prior to coating the same with said particle/powder mixture.

7. The process of claim 4 wherein said food material to be fried is coated with said particle/powder mixture and then with a mixture mainly comprising wheat flour and water.

8. A process for preparing a frozen fried food as set forth in claim 1, wherein 10 to 90% of said porous particles have particle sizes ranging from 3 to 50 mesh and the average particle size thereof is 3 to 25 mesh.

9. A process for a frozen fried food as set forth in claim 1, wherein said food material to be fried is coated with a powder prior to coating the same with said particle/powder mixture.

10. A process for preparing a frozen fried food as set forth in claim 1, wherein said food material to be fried is coated with a mixture mainly comprising wheat flour and water prior to coating the same with said particle/powder mixture.

11. A process for preparing a frozen fried food as set forth in claim 1, wherein said food material to be fried is coated with said particle/powder mixture and then with a mixture mainly comprising wheat flour and water.

12. The process of claim 1 wherein said ratio by weight is 1:2 to 5:1.

13. The process of claim 1 further comprising semi-frying the coated material before freezing.

14. The process of claim 1 wherein said semi-frying comprises heating the coated material in oil at 170° to 180° C. for 0.2 to 5 minutes.

15. The process of claim 1 wherein said mixture is ground after frying.

* * * * *